United States Patent
Sollami

(10) Patent No.: US 8,069,544 B2
(45) Date of Patent: Dec. 6, 2011

(54) DEVICE FOR EXTRACTING A QUICK-CHANGE TOOL HOLDER

(75) Inventor: Phillip A. Sollami, Herrin, IL (US)

(73) Assignee: The Sollami Company

( * ) Notice: Subject to any disclaimer, the term of this patent is extended or adjusted under 35 U.S.C. 154(b) by 583 days.

(21) Appl. No.: 12/193,866

(22) Filed: Aug. 19, 2008

(65) Prior Publication Data

US 2010/0048370 A1     Feb. 25, 2010

(51) Int. Cl.
*B23P 23/00* (2006.01)
(52) U.S. Cl. .............. 29/254; 29/275; 29/255; 29/278
(58) Field of Classification Search .......... 29/254, 29/244–253, 255–280; 269/3, 6, 95
See application file for complete search history.

(56) References Cited

U.S. PATENT DOCUMENTS

| 4,335,493 | A | * | 6/1982 | Shivers et al. ............... 29/254 |
| 4,476,861 | A | * | 10/1984 | Dimakos et al. ............. 606/100 |
| 5,875,534 | A | * | 3/1999 | Jackson ....................... 29/255 |
| 6,880,217 | B2 | * | 4/2005 | Garst ........................... 29/235 |
| 7,712,199 | B1 | * | 5/2010 | Wilson ......................... 29/254 |
| 2006/0022510 | A1 | * | 2/2006 | Sansone et al. .............. 299/95 |
| 2010/0048370 | A1 | * | 2/2010 | Sollami ......................... 483/65 |

FOREIGN PATENT DOCUMENTS

EP    1 045 075 A2    10/2000

* cited by examiner

*Primary Examiner* — Lee D Wilson
(74) *Attorney, Agent, or Firm* — Robert L. Marsh

(57) ABSTRACT

A retraction tool for removing the shank of a tool holder from a base block mounting includes an elongate threaded member having a hook threaded on one end thereof. The hook has a hook end for holding to the forward end of a tool holder. A hammer moveable along the length of the elongate member impacts against said stop for pulling said tool holder from said base block mounting.

8 Claims, 4 Drawing Sheets

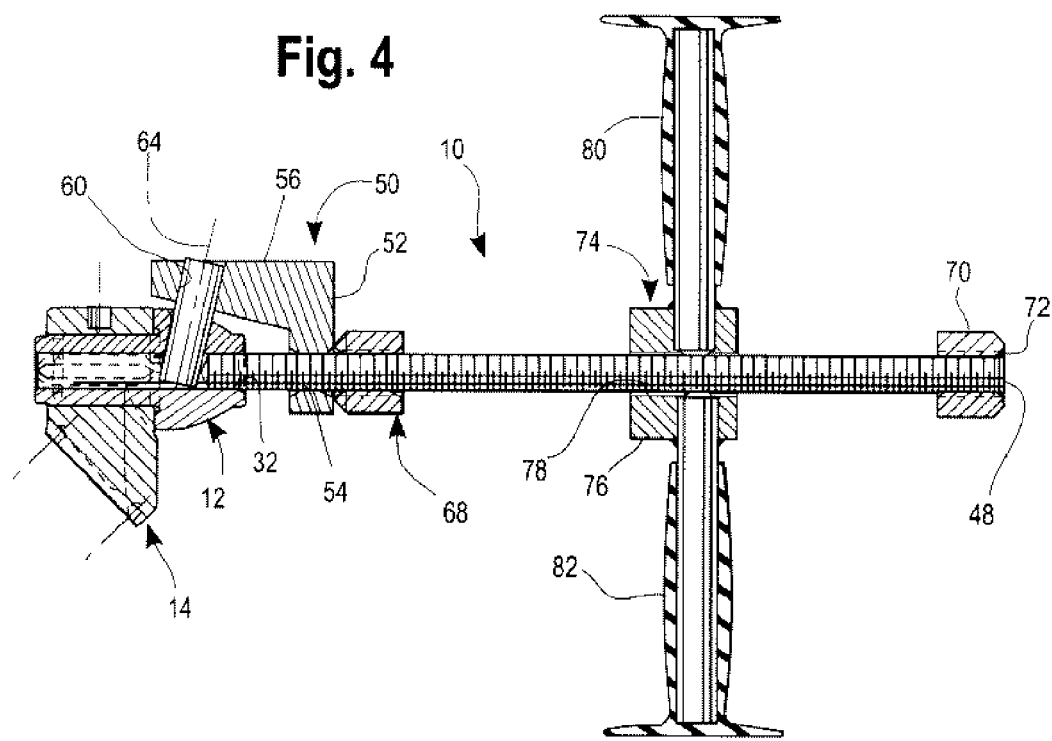
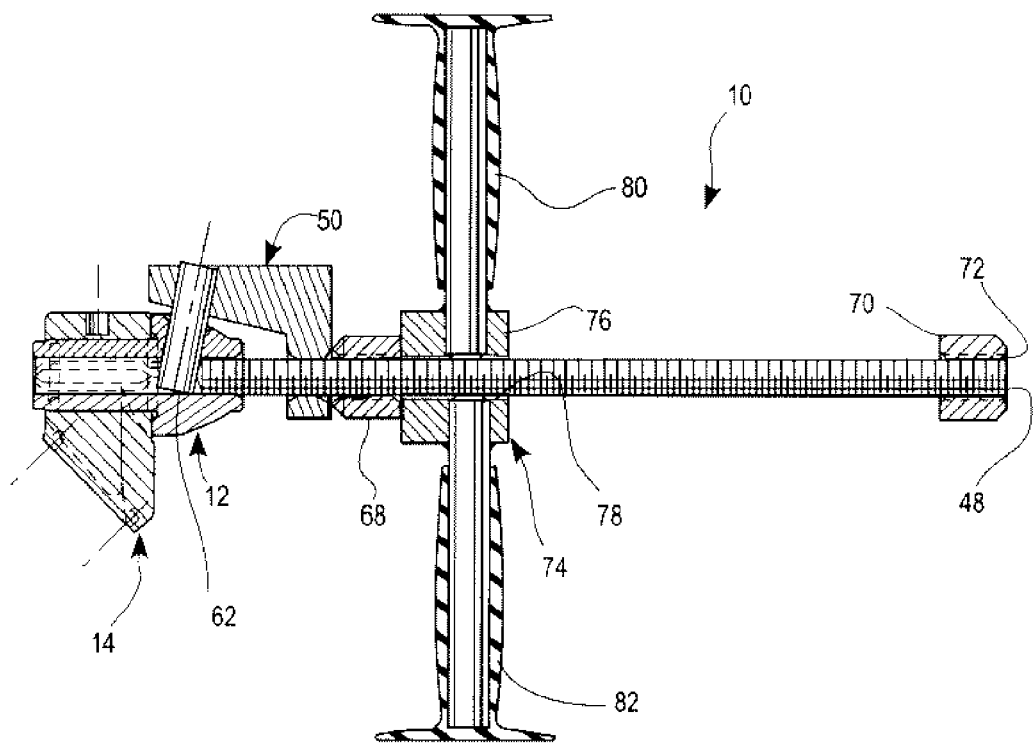

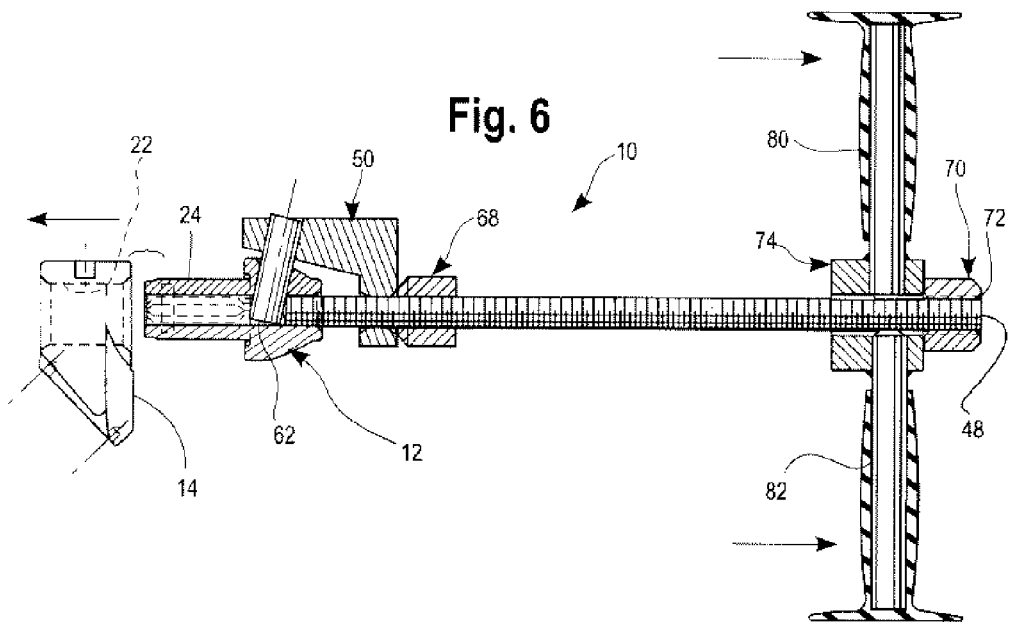
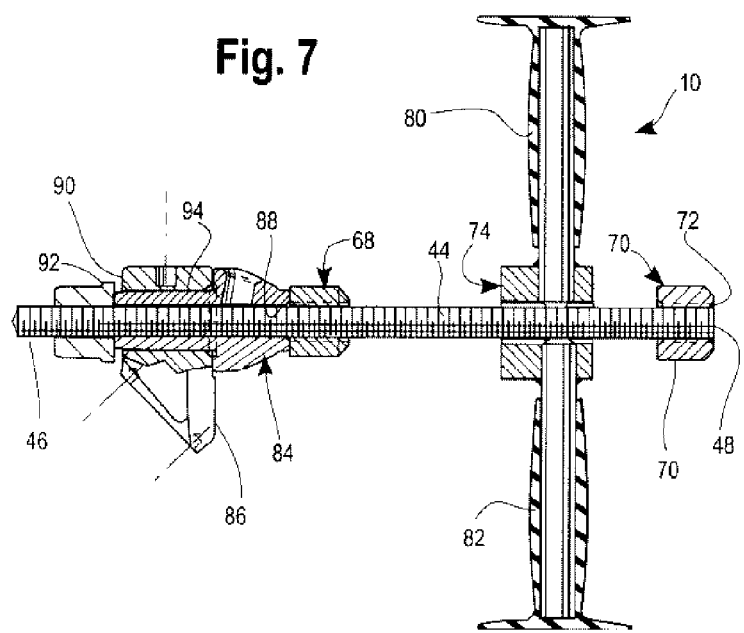

DEVICE FOR EXTRACTING A QUICK-CHANGE TOOL HOLDER

The present application relates to cutting machines having quick-change tool holders for retaining cutting tools, and to a device for extracting a worn quick-change tool holder from a base block mounting on a machine.

BACKGROUND OF THE INVENTION

In the course of resurfacing a concrete or asphalt pavement, the upper surface of the worn pavement is removed by a machine having a rotating drum and a plurality of rotatable tools mounted on the drum. Each tool is mounted by first welding to the drum a base block mounting having a bore suitable for receiving the shank of a removable quick-change tool holder. Fitted into the bore of the base block mounting is the shank of a replaceable quick-change tool holder having a retaining bore at the forward end for retaining the shank of a tool.

Where the tools are used to cut hard surfaces such as asphalt or concrete, the tools retained in the quick-change tool holder must rotate to wear evenly around their circumference and thereby maximize their useful life. A hard surface engaged by such tools nonetheless wears the tool rapidly. When the machine is used to cut hard surfaces it is common to replace the tools at least once a day. The hard surface that causes the tool to become rapidly worn also wears the tool holder that receives the rotatable shank of the tools. Although life expectancy of the tool holders may be several times longer than the life of the tools received therein, extended use of the machine will result in the tool holders becoming worn and requiring replacement.

A quick-change tool holder generally has a tapered forward end and extending axially rearwardly of the tapered forward end is a shank that is received in the complementarily shaped bore of the base block mounting on the machine. Preferably, the quick-change tool holder is the type disclosed in my previously issued U.S. Pat. Nos. 6,371,567 B1 and 6,585,326 B2, which are incorporated herein by reference.

Ideally, worn quick-change tool holders are removed from the base blocks of the machine using a punch and hammer to withdraw the shank from the bore of the base block mounting. The strong forces that are applied to the tools are also applied to the tool holders and the base block mountings as the machine cuts the hard surfaces, and those forces cause the various parts to become deformed such that the shank and quick-change tool holders cannot be easily extracted from the bore of the base block mounting. The problem becomes more complicated for tool holders mounted near the peripheral edges of the drum because several of such end mounted tool holders are oriented at an angle with respect to the drum that allows little or no access to the rearward end of the shank thereof. It is therefore difficult or nearly impossible to remove such quick-change tool holders from the retaining bore, and it is often necessary to use a torch to cut away portions of the worn tool holder in order to replace it.

In my co-pending patent application filed Dec. 4, 2006 and assigned Ser. No. 11/633,298 I disclosed a retraction device for retracting a quick-change tool holder from the bore of a base block mounting that includes an elongate shaft that extends through the bore of the quick-change tool holder with a nut, or other enlarged object positioned at the distal end of the shaft such that the nut and shank can be used to extract the tool holder from a base block mounting. Where the quick-change tool holder includes a moveable plunger, however, the use of the device of Ser. No. 11/633,298 requires that the plunger be first removed. There is therefore a need for a retraction device for retracting a quick-change tool holder from the bore of a base block mounting without requiring access to the rear end of the shank of the quick-change tool holder. There is also a need for a retraction device that does not require the removal of the plunger from the quick-change tool holder before the tool holder can be removed from the base block mounting.

SUMMARY OF THE INVENTION

Briefly, the present invention is embodied in an extraction device for removing a quick-change tool holder from a base block mounting. The quick-change tool holder to be removed is of the type having a generally planar forward surface behind which is an enlarged forward body behind which is a tubular shank that is receivable in the bore of a base block mounting. The quick-change tool holder has an axial hole extending through the enlarged forward body and through the shank with the diameter of the axial bore sized to receive the shank of a tool.

The enlarged forward end of the tool holder also has a receptacle to which a hook of a retraction tool in accordance with the invention is attachable. In the preferred embodiment the receptacle is a second cylindrical hole that extends into the outer surface of the enlarged forward end with the axis of the second hole being at an angle of least forty-five degrees with the axial hole and with the axis of the second hole intersecting the longitudinal axis of the axial hole.

The device for removing such a quick-change tool holder from its associated base block mounting includes an elongate member having a first end, a second, and a length with the first end sized to be slideably received in the axial hole of the quick-change tool holder. At least a portion of the first end is threaded and threaded on the first end is a hook that includes an elongate arm and a hook end shaped and oriented so as to extend around a portion of the enlarged forward end of a quick-change tool holder and grasp the receptacle thereon. In the preferred embodiment the hook end includes a dowel pin the free end of which is directed toward the axis of the elongate threaded member and makes an angle between 45 degrees and 90 degrees with the axial hole. The pin has an outer diameter sized to be received within the second hole to thereby grasp and hold the forward end of the tool holder. Positioned at or near the second end of the elongate member is an enlarged stop member, which preferably is a nut that is threadedly engaged to the second end of the elongate member and welded thereto. Positioned along the elongate member between the hook and the stop member is a hammer that is slideable along the length of the elongate member between the hook and the stop member. The hammer is made of metal and has sufficient mass such that quick movement of the hammer along the elongate member until it impacts against the stop member at the second end will remove the quick-change tool holder from the base block mounting.

To use the device of the present invention, the hook end of the hook is engaged with the receptacle and the elongate member is extended into the axial hole of the quick-change holder. Thereafter, the hammer is pounded against the stop to remove the quick-change holder.

BRIEF DESCRIPTION OF THE DRAWINGS

A better and more complete understanding of the invention will be had after a reading of the following detailed description taken in conjunction with the drawings wherein:

FIG. 4 is a cross-sectional view of the extraction device shown in FIGS. 1-3 locked to the quick-change tool holder immediately prior to extraction from the base block mounting;

FIG. 5 shows the parts shown in FIGS. 1 through 4 with the hammer positioned immediately before it is slammed against the stop;

FIG. 6 shows the hammer contacting the stop to thereby apply an impact to pull the quick-change tool holder out of the base block mounting; and FIG. 7 shows the extraction device with the hook removed and the parts assembled in an alternative configuration for removing the quick-change tool holder without a plunger from the base block mounting.

DETAILED DESCRIPTION OF PREFERRED EMBODIMENT

Figure 1:
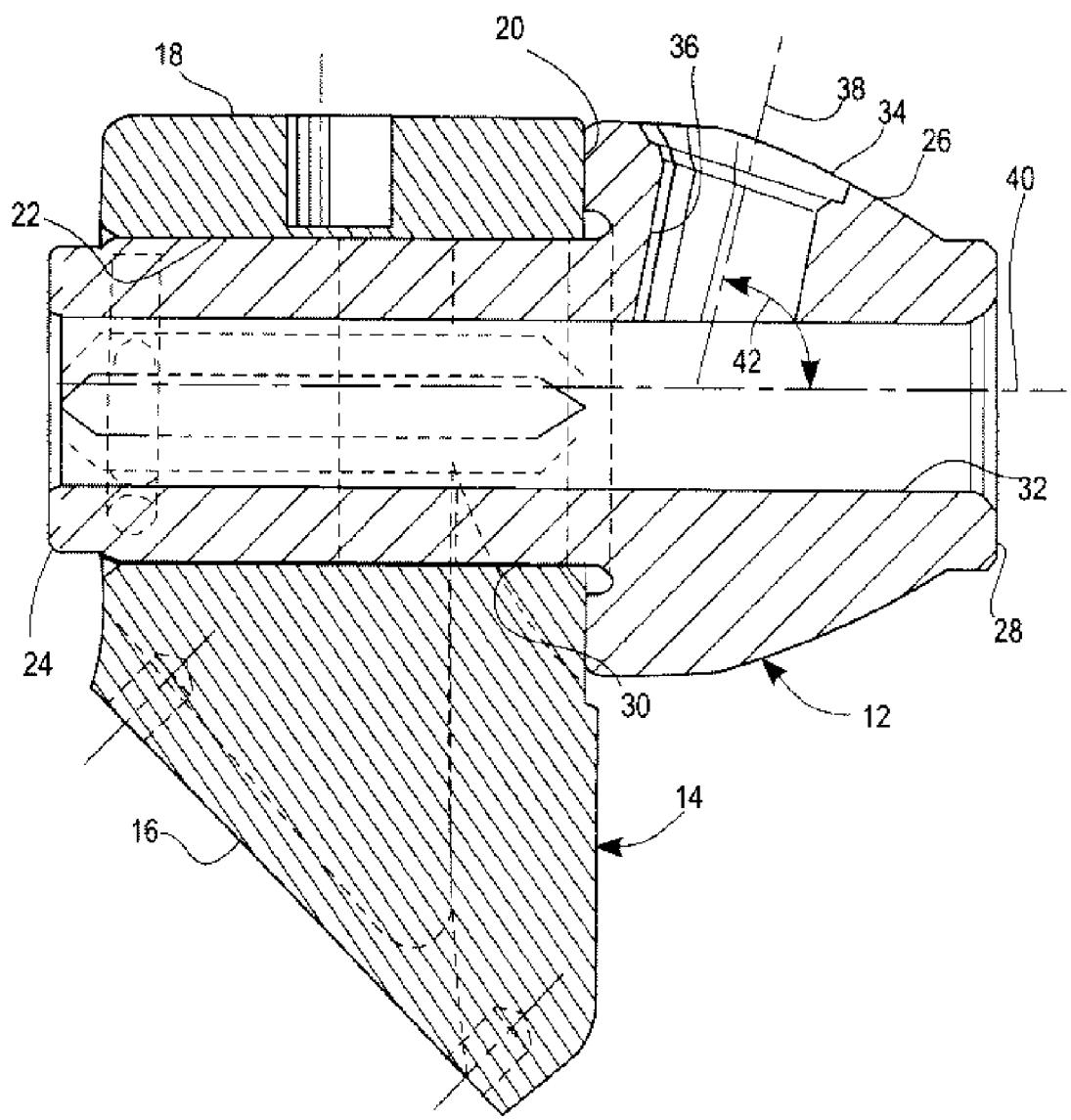
FIG. 1 is a cross-sectional view of a quick-change holder having a receptacle in the form of a second hole therein, the parts shown greatly enlarged compared to all subsequent figures.

Referring to FIGS. 1 through 6, the extraction device 10 of the present invention is employed to remove a quick-change tool holder 12 from a base block mounting 14 which in turn is mounted on a rotating drum, not shown, of a machine. The base block mounting 14 includes a mounting portion 16 suitable for attachment to the drum of a machine and a body 18 having a forward surface 20 and an axial bore 22. Fitted into the axial bore 22 is a shank 24 of the quick-change tool holder 12. The quick-change tool holder 12 further has an enlarged forward end 26 that diverges rearwardly from a transverse planar forward surface 28 and having a planar rearward surface 30 that abuts against the planar surface 20 of the base block mounting 14. Extending longitudinally through the length of the enlarged forward end 26 and the shank 24 is an axial hole 32 having an inner diameter sized to receive the shank of a tool, not shown.

The quick-change holder also includes a receptacle 36 for attachment thereto by means of a hook as is further described below. In the preferred embodiment the receptacle 36 is configured as a second hole 36 extending into the outer surface 34 of the enlarged forward end 26, the second hole having an axis 38 that intersects and is at an angle 42 with the longitudinal axis 40 of the axial hole 32. Preferably the angle 42 is at least forty-five degrees but no more than ninety degrees. I have found that an angle 42 of approximately seventy-eight degrees is most desirable for use with the tool 10. It should be appreciated that the receptacle 36 may have many other configurations that are suitable for being grasped by a hook as is described below. For example the receptacle may be an annular groove around the circumference of the enlarged forward end 26, or a pair of diametrically opposed notches, either configuration of which is suitable for receiving a removable attachment device.

To remove the quick-change tool holder 12 from the bore 22 of the base block mounting 14, the device 10 includes an elongate shaft 44 having a first end 46 and a second end 48. At least a portion of the first end 46 is threaded. Since long lengths of threaded shafts are readily available the invention is most easily constructed using a shaft threaded along its entire length as shown in the drawings. Threaded onto the first end 46 is a hooked arm 50 having a first arm portion 52 with a transverse threaded hole 54 therein for threadedly receiving the threads of the elongate member 44. The hooked arm 50 also includes an angled second portion 56 having a surface 58 shaped to extend around the outer surface of the enlarged forward end 26 of the quick-change tool holder 12. Near the distal end of the angled second portion 56 is a hook end 62 suitable for grasping the receptacle 36 on the quick-change holder 12. In the preferred embodiment the hook end 62 is an elongate pin having one end welded into a second transverse hole 60 in the second arm portion 56. The pin 62 has an outer diameter that is a slightly smaller than the inner diameter of the second cylindrical hole (the receptacle 36) of the quick-change tool holder 12. The axis 64 of the cylindrical pin 62 is oriented at an angle 66 that is equal to the angle 42 between the axis of the second hole 36 and the longitudinal axis 40 of the quick-change tool holder 12 so as to be attachable to the receptacle 36 as is further described below. It should be appreciated that the hook end 62 may have any of a number of configurations depending on the configuration of the receptacle 36. For example, if the receptacle 36 is an annular groove around the forward end 26 of the quick-change tool holder 12, or is a pair of diametrically spaced apart notches, the hook end 62 may be configured as a yoke having spaced apart opposing ends sized and shaped to fit within the annular groove, or fit within the notches to thereby hold the hook end 62 to the quick-change tool holder 12.

Fitted on the elongate member 44 behind the hooked arm 50 is a first threaded nut 68. Attached to the second end 48 of the elongate member 44 is a stop 70. Where the elongate member 44 is threaded along its entire length as shown the stop 70 may be a second threaded nut as shown. If the stop is a nut a weldment 72 firmly attaches the stop 70 to the second end 48 locking it to the elongate member such that a wrench, not shown, can engage the hex head of the second nut to rotate the elongate member 44.

Fitted around the elongate member 44 between the first nut 68 and the stop 70 is a slideable hammer 74 having a body 76 with a transverse hole 78 therein having a diameter large enough to slideably receive the elongate member 44. Extending from opposite sides of the body 76 are handles 80, 82 with the longitudinal axis of the handles 80, 82 oriented perpendicular to the longitudinal axis of the elongate member 44. Preferably the elongate member has an overall length of about 18 inches and the hammer 74 has a slideable range of movement of about twelve inches.

Figure 2:
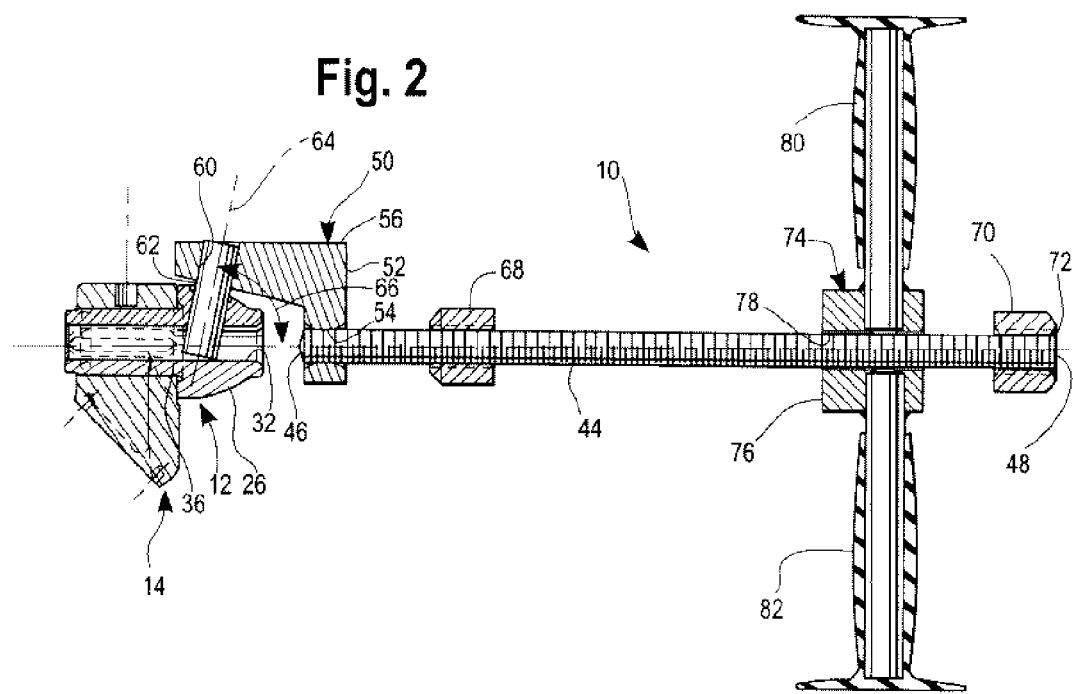
FIG. 2 is a cross-sectional view of the quick-change tool holder and associated base block mounting shown in FIG. 1 with the hook end of the extraction device in accordance with the invention engaged in the receptacle, that is the second hole, of the quick-change tool holder.
Figure 3:
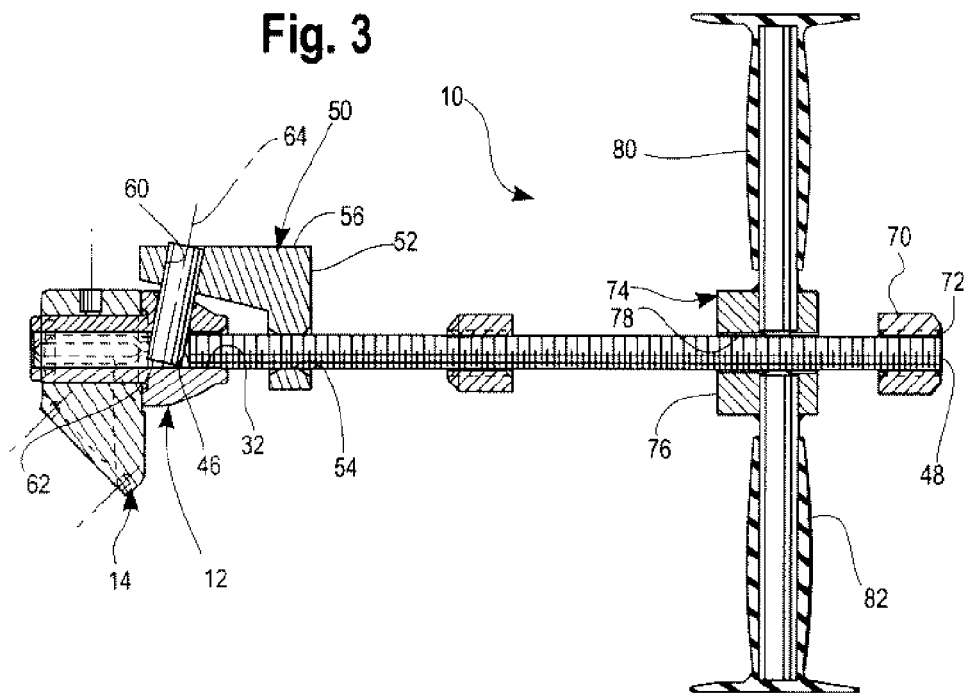
FIG. 3 shows the quick-change tool holder, base block mounting, and extraction device of FIGS. 1 and 2 after the threaded shaft thereof is engaged into the axial bore of the quick-change tool holder.

Referring to FIG. 2, to employ the device 10 the hook end 62, in this embodiment the hook end is the end of the cylindrical pin 62, is engaged into the receptacle 36, which in this embodiment is the second cylindrical hole of the quick-change tool holder 12. As shown in FIG. 3, thereafter the stop 70, or second threaded nut, attached to the elongate member 44 is rotated to thread the elongate member 44 through the threaded hole 54 on the hook 50 and into the axial hole 32 of the quick-change tool holder 12. The elongate member 44 is extended into the axial hole 32 until the end 46 of the elongate member 44 contacts the distal end of the pin 62. As shown in FIG. 4, the parts are then locked into position by hand tightening the first threaded nut 68 against the rearward surface of the hook arm 50. As shown in FIGS. 5 and 6, one operates the device by grasping the handles 80, 82 with his hands and longitudinally moving the hammer 74 from a position against the first nut 68 (as shown in FIG. 5) along the length thereof and causing it to impact against the stop 70 (as shown in FIG. 6) to thereby disengage the shank 24 of the quick-change holder 12 from the axial bore 22 of the base block mounting 14. After removal from the base block mounting 14 the quick-change tool holder 12 will remain connected to the end 46 of the elongate member 44 and will not drop so as to cause personal injury or property damage.

Referring to FIG. 7, portions of the device 10 may be used to extract a quick-change tool holder 84 from a base block mounting 86 which does not have a plunger therein, or the plunger has been removed. In this embodiment the hook arm 50 is unnecessary and is unthreaded from the first end 46 of the elongate member 44. The first end of the elongate member 44 is then extended through the axial hole 88 of the quick-change tool holder 84 until a portion thereof extends outward of the rearward end 90 thereof. A third threaded nut 92 is fitted on the first end 46 and the quick-change tool holder 84 is then snugly retained between the first and third threaded nuts 68, 92. Thereafter, the hammer 74 is moved along the elongate member 44 as described above to strike the stop 76 to force the shank 94 of the quick-change tool holder 84 out of the bore of the base block mounting 86.

Where the elongate member 44 has threads along its entire length, it is desirable that the threads of the elongate member 44 have a flat and wide outer surface so as not to become worn as a result of the movement of the hammer 74. Preferably, the threads are ¾-5 Acme threads. Accordingly, the threads in the threaded hole 54 of the hook arm 50 and in the various nuts 68, 70, 92 are female ¾-5 Acme threads.

While the present invention has been described with respect to a single embodiment, it will be appreciated that many modifications and variations may be made without departing from the spirit and scope of the invention. It is therefore the intent of the appended claims to cover all such modifications and variations that fall within the spirit and scope of the invention.

What is claimed:

1. The combination comprising
a tool holder,
said tool holder having a forward end and an axial shank,
said tool holder also having an axial hole for receiving the shank of a tool, and a receptacle in said forward end for attachment of an extraction tool thereto, and
an extraction tool,
said extraction tool having an elongate member having a first end, a second end and a length, and a threading on at least said first end,
said first end sized to be received in said axial hole of said tool holder,
said extraction tool further having a hook having a transverse threaded hole for threadedly receiving said threading of said elongate member for threadedly attaching said hook thereto,
said hook having a hook end receivable in said receptacle and attaching said extraction tool to said tool holder,
a stop on said elongate member spaced from said first end, and
said extraction tool also having a hammer longitudinally moveable along said elongate member between said hook and said stop wherein an impact of said hammer against said stop will remove said tool holder shank from said base block mounting bore.

2. The combination of claim 1 wherein said receptacle is a second hole in said forward end, said second hole at an angle between forty five and ninety degrees with said axial hole.

3. The combination of claim 2 wherein said second hole is at an angle of about seventy-eight degrees with said axial hole.

4. The combination of claim 1 and further comprising a nut on a threading on said elongate member between said hook on said hammer wherein said nut is tightenable against said hook for locking said hook with respect to said elongate member.

5. The combination of claim 4 wherein said second end is threaded and said stop is a second nut welded to said second end.

6. The combination of claim 5 wherein said hammer includes a handle for manually striking said slide against said stop for applying a force to remove said tool holder shank from said base block mounting bore.

7. The combination of claim 2 wherein said second hole has a diameter at least equal to a diameter of said axial hole.

8. The combination comprising
a tool holder,
said tool holder having a forward end and an axial shank,
said tool holder also having an axial hole for receiving the shank of a tool, and a receptacle in said forward end for attachment of an extraction tool thereto, and
an extraction tool,
said extraction tool having an elongate member having a first end, a second end and a length,
said first end sized to be received in said axial hole of said tool holder,
said extraction tool further having a hook attached to said first end of said elongate member,
said hook having a hook end receivable in said receptacle for attaching said extraction tool to said tool holder,
a stop on said elongate member spaced from said first end, and
said extraction tool also having a hammer longitudinally moveable along said elongate member between said hook and said stop wherein an impact of said hammer against said stop will remove said tool holder shank from said base block mounting bore.

* * * * *